2 Sheets—Sheet 1.

W. H. OSTRANDER.

Assignor to the OSTRANDER REPEATING GUN COMPANY.

REPEATING BREECH LOADING GUN.

No. 11,295. Reissued Dec. 13, 1892.

Witnesses.

F. Cleveland

H. G. Gladden

Inventor

Willis H. Ostrander by Spear & Seely

Attorneys.

THE NORRIS PETERS CO., PHOTO-LITHO., WASHINGTON, D. C.

2 Sheets—Sheet 2.

W. H. OSTRANDER.

Assignor to the OSTRANDER REPEATING GUN COMPANY.

REPEATING BREECH LOADING GUN.

No. 11,295. Reissued Dec. 13, 1892.

Witnesses.

H. Montenverde.

H. Gladden

Inventor

Willis H. Ostrander by Spear & Seely

Attorneys

THE NORRIS PETERS CO., PHOTO-LITHO., WASHINGTON, D. C.

UNITED STATES PATENT OFFICE.

WILLIS H. OSTRANDER, OF MERCED, ASSIGNOR TO THE OSTRANDER REPEATING GUN COMPANY, OF SAN FRANCISCO, CALIFORNIA.

REPEATING BREECH-LOADING GUN.

SPECIFICATION forming part of Reissued Letters Patent No. 11,295, dated December 13, 1892.

Original No. 450,773, dated April 21, 1891. Application for reissue filed June 18, 1891. Serial No. 396,773.

*To all whom it may concern:*

Be it known that I, WILLIS H. OSTRANDER, a citizen of the United States, residing at Merced, Merced county, State of California, have invented an Improvement in Repeating-Guns; and I hereby declare the following to be a full, clear, and exact description of the same.

My invention relates to certain improvements in that class of weapons known as "magazine-guns" or "repeaters;" and it is especially applicable to shot-guns having two barrels upon a single stock.

It consists of a stock having two barrels mounted thereon so as to slide forward and back, and a connecting-rod actuated by the movement of these barrels, and a mechanism operated by said rod, whereby loaded shells are carried from the magazine and introduced into the barrels of the gun, discharged shells being ejected by the same movement and the hammers drawn back into position for firing.

It also consists in locking devices for the barrel and the hammers and a means for operating said devices, also a means whereby either of the barrels may be loaded or operated independent of the other, and in certain details of construction.

Figure 1:
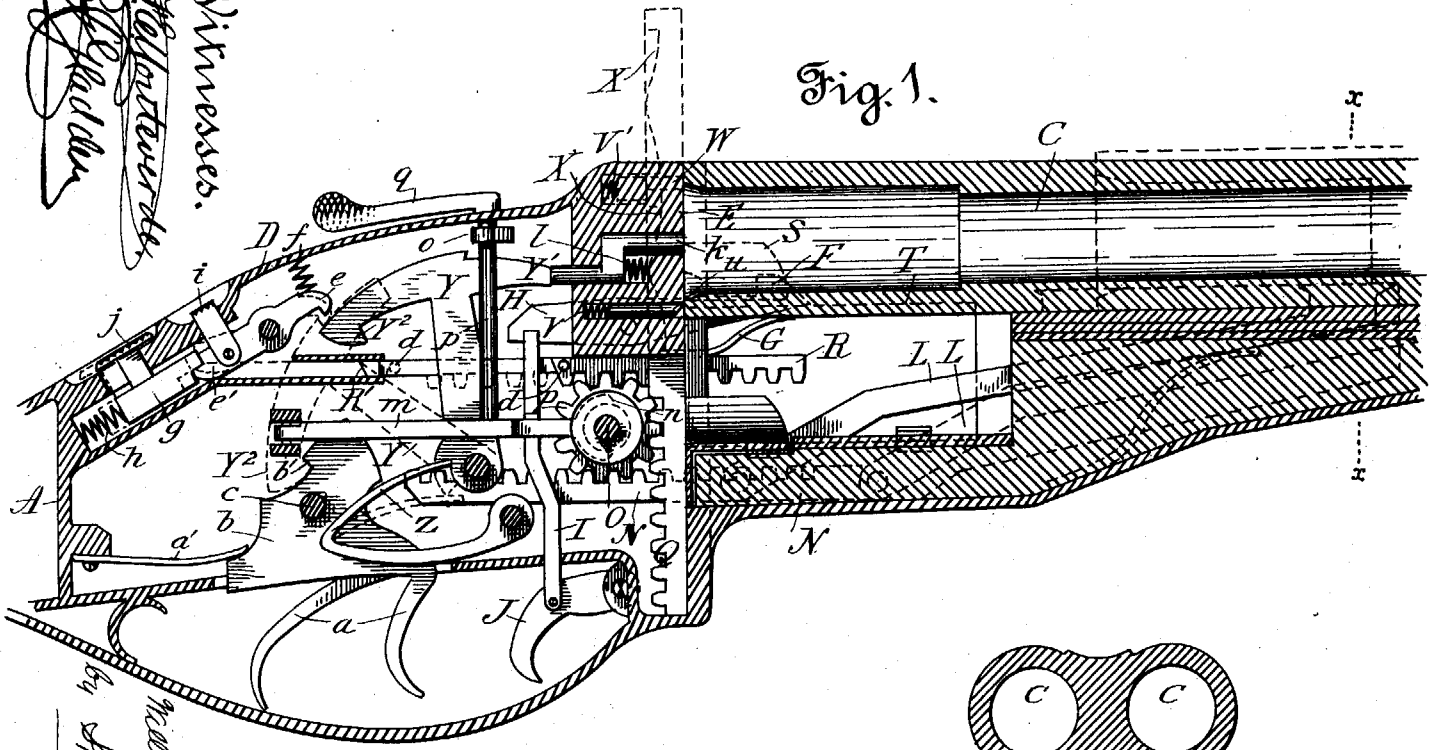
Figure 2:
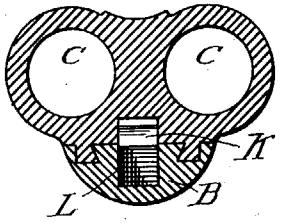
Figure 3:
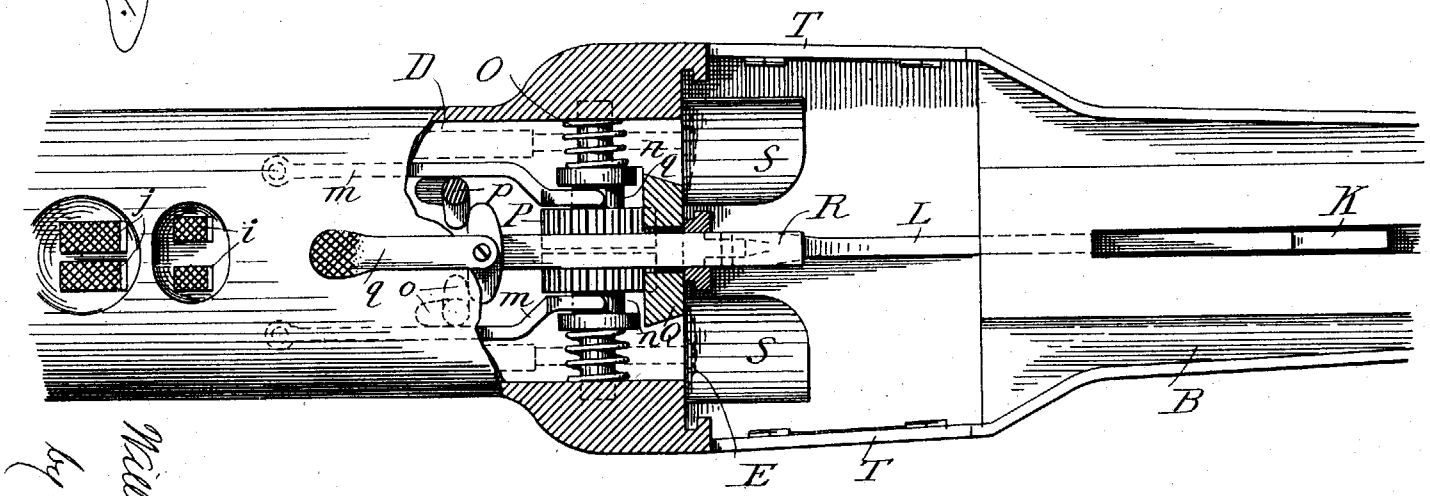
Figure 4:
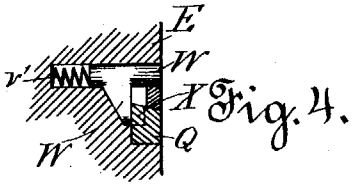

Referring to the accompanying drawings for a more complete explanation of my invention, Figure 1 is a longitudinal vertical section taken through one of the barrels and the actuating mechanism, showing the parts closed and in a normal position. Fig. 2 is a cross-section through *x x*, Fig. 1. Fig. 3 is a plan view, with parts broken away to show the interior. Fig. 4 is a detail view of one of the stops W.

A is the stock of the gun. B is the front extension of said stock, called the "fore-end," within which a pair of barrels C is fitted to slide forward or back.

D is the casing within which the operating mechanism is contained.

E is the standing-breech against which the rear end of the barrels abut when they are closed and locked in position.

F is the locking-latch by which the barrels are held in place when closed. This latch engages a corresponding slot in the web between the barrels and is held up by a spring G. The front end of this latch is inclined or beveled, so that when the barrels are drawn backward they will easily depress the latch by pressing down the spring G and will slide over it until the notch or channel arrives at the latch, when the latter will be forced upward by the spring, and thus lock the barrels securely in place. It will be manifest that two or more of these catches may be arranged to operate simultaneously, so as to insure a strong and safe lock to hold the barrels in place.

The latch F is formed upon the front end of a pivoted arm or lever H, which extends back into the casing D, and its rear end is engaged by a vertical rod or bar I, which projects up from the lower portion of the casing, through which it passes. The lower end of this bar is connected with a trigger J, which has its front end fulcrumed suitably to the casing or stock. It will be manifest that when this trigger is pulled backward and upward it will, through the connecting-rod I, raise the rear end of the lever H, and thus depress the front end of the latch F, disengaging it from the locking-notch of the barrels.

The barrels are fitted to slide in guides upon the stock, and they have a slot formed in the rib between them, which is engaged by the outwardly-projecting catch K upon the front end of the connecting-rod L. This rod L is pressed upward by a spring M, so that the catch K is always in position to be engaged by the slot which connects it with the barrels. If it is desired at any time to disengage the barrels, it is done by pressing downward upon the connecting-rod L, when the barrels may be easily slipped out of the fore-end of the stock. The rear end of the connecting-rod L is pivoted to the front end of a rack-bar N, having teeth upon its upper surface, and this rack-bar is guided so as to move horizontally within the case containing the operating mechanism.

O is a shaft journaled within the casing and having upon it the loosely-turning pinions P, the teeth of which engage with the teeth of the rack N. Each of these pinions also engages with a vertical rack Q and another horizontal rack R, which latter moves above the pinion. Each of the rack-bars Q carries a segment S, which is of such shape as to receive the rear end of the shell, and when the barrels C are moved forward they act, through the connecting rod or link L and the rack-bar N, to rotate the pinions P, and by its engagement with the racks Q it will raise the latter, causing them to slide up in the guides within which they travel, and thus the segments S are raised, carrying with them the shells from the magazine below the line of the barrels up to a point opposite the rear opened ends of the barrels, so that when the latter are drawn back again the front ends of the shells will enter the barrels, and when the latter are closed and locked in place the shells will be in position for firing.

The slot in the barrels into which the lug K projects is long enough so that the barrels may be moved back far enough to enter the front ends of the shells into the rear ends of the barrels before the carriers S are acted upon by the racks and pinions, so as to commence their descent, and by the time this action takes place the front ends of the shells are securely supported within the barrels, so that they will be completely introduced by the completion of the rearward movement of the barrels, while the carriers S descend to their normal position beneath the magazines. These magazines are placed one beneath each barrel and are designed to contain only two extra cartridges, so that when the gun has been loaded there will be two cartridges in the barrels of the gun, and two more are introduced into the magazines beneath through gates or doors T on the sides of the stock. The flanges of the shells travel up in slots in the vertical guides, which stand upon each side of the standing-breech E, as shown.

U are pins, which project horizontally beneath each of the standing-breeches, and these pins are pressed forward by springs V, so as to project slightly into the paths of the shells as they are moved upwardly by the carriers S. The front ends of these pins are beveled, so that when the upwardly-moving shell strikes the pin it will press it backward against the spring V, and thus allow the shell to rise until it has passed the pin, when the spring V will force the pin out again just beneath the lower edge of the flange of the shell, and this prevents it from moving downward when the carrier S begins to descend.

W W are other pins projecting just above the upper edges of the flanges of the shells when they are in position to enter the gun, and these pins prevent the shell from being forced upward and thrown out before the proper time. These pins are actuated by springs V′, similar to those which actuate the pins U.

Upon the upper ends of the vertical rack-bars Q are formed cams X, and the pins W have projections, as shown at W′, which are engaged by the curved cam shapes X, so that when the rack-bar Q is being moved upward by the action of the pinion P the cam X will withdraw the pin W, and this allows the discharged shell (which is withdrawn from the barrel of the gun by the forward movement of the barrels) to be forced upward and ejected by the upward movement of the loaded shell from the magazine below. As the cam X moves upward it allows the pin W to be again forced out by its spring V′, so that by the time the loaded shell has reached the proper position to be introduced into the barrel of the gun this pin will be again projected to act as a stop and prevent the shell from being raised too high.

Y Y are the hammers, which are suitably fulcrumed within the case D and are acted upon by the mainsprings Z.

*a* are the triggers by which each of the hammers is disengaged, so as to fire the cartridge in its barrel.

*a′* are the rear springs, which return the triggers after they are pulled. These triggers have the plates *b* projecting into the casing and fulcrumed upon the pin *c*. Each hammer Y has the front or striking end Y′ and upon the opposite or rear end the hook $Y^2$, which is engaged when the hammer has been drawn back by a corresponding notch *b′* upon the plate *b*.

The hammers are withdrawn to the position of full-cock by the action of the rack-bar R, which carries pins *d*, projecting upon each side, and these pins, pressing upon the shank of the hammer, as plainly shown in Fig. 1, will force the hammer back until the hook portion $Y^2$ is engaged by the notch *b′*, and is thus held in position.

*e* is a safety-hook fulcrumed in the upper part of the case and acted upon by the spring *f*, which causes it to engage with a corresponding notch on the upper front end of the hammer, as shown in Fig. 1, and this prevents the gun from being discharged as long as this engagement continues. When the hammer is in its forward position, the hook *e* is held up by means of a sliding bar *g*, having a latch upon its front end, which engages a corresponding latch at the rear end of the lever-arm *e′*, which carries the latch *e*. The bar *g* is forced forward, so as to engage the rear of the lever-arm *e′*, by a spring *h*. It is forced backward against its spring, so as to release the rear end of the lever *e*, by the beveled rear end R′ of the rack-bar R, this movement taking place when the rack-bar R is moved backward during the forward movement of the barrels for loading the gun and simultaneously with the drawing back of the hammer Y. The rear end R′ of the rack-bar R, engaging the sliding latch-bar *g*, moves it backward until it releases the lever-arm *e′*, and the pressure of the spring *f* upon this lever-arm throws the hook *e* down upon the top of the hammer Y, so that when the latter has been drawn back sufficiently for the hook $Y^2$ at its rear end to be engaged by the notch *b′* of the trigger the hook *e* will also engage the notch in the hammer, and thus lock it, so that the gun cannot be fired without first disengaging this hook.

This makes the gun perfectly safe at all times after it is loaded until it is desired to fire it.

The safety-hook *e* is disengaged by pressing down upon the button *i* on the top of the stock, and this button acts upon the rear end of the lever *e'*, and this raises the hook *e* out of the notch in the hammer, so as to release the latter. When this is done, the engaging-notch at the rear end of the lever *e'* is brought into position, so that the corresponding latch on the sliding bar *g* will be forced forward by its actuating-spring *h* and will engage the lever *e'*, and thus hold it up out of engagement with the hammer. It will be manifest that either one of the hammers may thus be disengaged for firing purposes, and either one of them may be again locked without operating the gun-barrels and loading mechanism by simply withdrawing the sliding bar *g* until the notch is released and the hook *e* allowed to again engage with the hammer.

The sliding bars *g* are withdrawn to disengage them from the levers *e'* by means of the thumb-pieces *j*, which project up through the stock just behind the thumb-pieces *i*, as shown. When the hammer falls, it strikes upon the rear end of the firing-pin *k*, this firing-pin being so shaped that its front end will be forced against the primer in the shell, so as to discharge the latter and fire the gun. The firing-pin is retracted whenever released by a spring *l*, which acts upon it for this purpose.

If it is desired to load but a single barrel of the gun in case of only one discharge having taken place, this is effected by temporarily disengaging the pinion P of the barrel which is not to be loaded from the rack-bar N. As the two pinions P turn loosely upon the shaft O, they may be moved longitudinally upon the shaft far enough to disengage either of them from the rack-bar N. This rack-bar is sufficiently wide to engage both the pinions when in their normal positions; but either of them may be moved along the shaft sufficiently to disengage them from the rack-bar, and when one is thus disengaged the movement of the barrels, which has been previously described, will only cause the rack-bar to act upon the pinion and mechanism of the other barrel. This movement for each pinion is effected by means of a clutch-lever *m*, having its rear end fulcrumed within the casing D, and its front end projecting with a fork which engages a corresponding groove or channel in the pinion-hub, (shown at *n*.) Either of the levers *m* is moved so as to force its pinion outwardly by means of a bell-crank lever *o* upon the vertical shaft *p*, and this shaft has the portion of the lever upon its upper end so arranged as to be engaged by a lever *q*, which is pivoted upon the top of the gun-stock, so as to be readily moved about its pivot to either one side or the other.

When moved in one direction, one of the pinions P is disengaged from the rack-bar N, and when moved in the opposite direction the other pinion will be disengaged. Both pinions are returned into engagement by springs, which act to force them back into place as soon as relieved from the pressure of the levers. By this arrangement it will be manifest that whenever the lever *q* is pushed to one side it disengages one of the pinions from the rack-bar, and the gun-barrels being then moved forward and back, as previously described, only one shell will be discharged and a new load placed in the corresponding barrel, while the others will remain unmoved. The loaded shell which is not moved is simply held in its place by the guides and stops which hold its flange, so that the barrels may easily be moved out and backward again without disturbing this shell.

Having thus described my invention, what I claim as new, and desire to secure by Letters Patent, is—

1. In a gun, the barrels sliding upon the fore-end of the stock, the magazines seated beneath the rear ends of the barrels, a vertically-moving carrier, and the guides within which the flange of the shell travels, in combination with a rotary pinion, a rack-bar connected with the sliding barrels and engaging said pinion, and a vertically-moving rack-bar to which the carrier is attached and by which it is raised and depressed, substantially as herein described.

2. A repeating-gun consisting of a stock, one or more barrels adapted to slide forward and back in guides upon the fore-end of said stock, a horizontally-moving rack-bar and a link connecting said rack-bar with the moving barrel, a pinion journaled within the stock and engaging the sliding rack-bar, a second rack-bar engaging the pinion and moving in vertical guides, a magazine situated beneath the rear end of the barrel, and a carrier adapted to receive the shell within the magazine, said carrier being attached to the vertically-moving rack-bar, so that in its upward movement it will raise the shell to a position opposite the rear end of the barrel, substantially as herein described.

3. In a repeating-gun, a stock, one or more barrels adapted to slide forward and back, a magazine situated beneath the rear end of the barrel, a rack-bar connected by a link with the sliding barrel, a pinion journaled in the stock and engaged by said rack-bar, so as to be rotated by the reciprocation of the latter, a vertical rack-bar actuated by the pinion, and a carrier fixed to the vertically-moving rack-bar and adapted to raise a cartridge from the magazine to a point opposite the rear end of the barrel, in combination with guides within which the flange of the rear end of the shell travels and spring-actuated stop-pins whereby the shell is held after having been lifted to its position ready to enter the barrel, substantially as herein described.

4. The vertically-moving carrier, in combination with the spring-actuated stop-pin in the upper portion of the standing-breech just above the upper edges of the flanges of the shells when said shells are in position and the cam X, connected with the carriers, whereby the stop-pin is retracted or allowed to project, substantially as herein described.

5. A repeating-gun consisting of the stock, one or more barrels sliding in guides upon the fore-end of said stock, a horizontally-moving rack-bar, a pinion journaled in the stock engaged by said rack-bar, and operating mechanism moved by said pinion, in combination with a link extending from the front end of the rack-bar, a spring whereby the front end of said link is raised, a lug fixed upon the front end of the link, and a slot formed in the rib of the sliding barrel and engaged by said lug, so that the movement of the barrel is communicated to the sliding rack-bar, substantially as herein described.

6. A repeating-gun consisting of the stock, one or more barrels sliding in guides upon the fore-end of said stock, a pinion and rack-bars connected with the barrel and actuated by the forward and backward movements of said barrel, a spring-actuated locking-catch F, and a rod I, engaging said catch and trigger J for operating said rod, whereby said catch may be disengaged and the barrel released, substantially as herein described.

7. A repeating-gun consisting of a stock, one or more barrels sliding in guides upon the fore-end of said stock, a horizontally-moving rack-bar connected with and actuated by said barrel, a pinion journaled within the stock and engaging said rack-bar, a vertically-moving rack-bar engaging said pinion and having the cartridge-carrier fixed to it, and a second horizontally-moving rack-bar engaging the pinion, having the lug or pin projecting from it, in combination with the hammer fulcrumed within the casing, so as to be engaged by the lug upon the rack-bar when the latter is moved backwardly, the trigger, and notched trigger-blade adapted to engage and hold the hammer when it is withdrawn, substantially as herein described.

8. The hammer fulcrumed within the casing and the horizontally-moving rack-bar for actuating the same, in combination with a notched trigger-blade within the lower part of the casing, having a notch engaged by the hammer when the latter is drawn back, and a safety-catch in the upper part of the casing in the path of the hammer and adapted to engage a notch therein to hold the hammer independently of the trigger-blade, substantially as herein described.

9. The combination, with the hammer and its actuating mechanism, of the spring-actuated catch in the path of the hammer for holding the latter independently of the trigger, a sliding locking-plate *g*, engaging the arm of the spring-actuated catch out of engagement with the hammer, a thumb-piece on the sliding plate, and a thumb-piece on the catch, substantially as and for the purpose described.

10. The sliding barrel moving in guides upon the fore-end of the stock, a rack-bar connected by a link with said barrel, a pinion journaled within the stock and engaged by said rack-bar, a second rack-bar engaging the pinion, moving horizontally, and having a lug which engages the hammer and forces it backward when the barrels are moved, so as to rotate the pinion, a spring-actuated safety-catch, a sliding latch by which said catch is held out of engagement with the hammer, and an inclined face R′ at the rear of the rack-bar, adapted to force the locking-slide backward and disengage it from the safety-catch, substantially as herein described.

11. A magazine-gun consisting of a pair of barrels moving in guides upon the fore-end of the gun-stock, horizontally-moving rack-bars connected by links with each of the barrels, corresponding pinions journaled loosely upon the shaft within the stock and engaged by said rack-bars, loading mechanisms actuated by said pinions to load both barrels simultaneously, clutch-levers engaging each of the pinions, and an arm or lever operatively connected to said clutch-levers, whereby either pinion may be thrown out of engagement with the actuating rack-bar and the mechanism actuated by said pinion remain stationary while the other is operated, substantially as herein described.

12. In a gun, the combination of a stock having two barrels mounted thereon so as to slide forward and backward, a magazine below the rear ends of said barrels, a connecting-rod actuated by the movement of the barrels, and a mechanism, substantially as described, operated by said rod whereby loaded shells are carried from the magazine to a position in rear of and in line with said barrels, discharged shells ejected by the same movement, and the hammers drawn back into position for firing, substantially as set forth.

In testimony whereof I have hereunto set my hand, this 20th day of May, 1891, in the presence of two witnesses.

WILLIS H. OSTRANDER.

Witnesses:

THOS. M. O'BRIEN,

H. A. SCOTT.